(12) United States Patent
Krumbacher et al.

(10) Patent No.: US 9,950,423 B2
(45) Date of Patent: Apr. 24, 2018

(54) INDUSTRIAL ROBOT WITH A DRIVE ARRANGEMENT ARRANGED ON AN ARM EXTENSION

(71) Applicant: KUKA Roboter GmbH, Augsburg (DE)

(72) Inventors: Rainer Krumbacher, Rettenbach (DE); Andre Reekers, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 14/784,389

(22) PCT Filed: Apr. 11, 2014

(86) PCT No.: PCT/EP2014/057438
§ 371 (c)(1),
(2) Date: Dec. 2, 2015

(87) PCT Pub. No.: WO2014/170237
PCT Pub. Date: Oct. 23, 2014

(65) Prior Publication Data
US 2016/0114480 A1    Apr. 28, 2016

(30) Foreign Application Priority Data
Apr. 16, 2013   (DE) .......................... 10 2013 206 791

(51) Int. Cl.
*B25J 9/12* (2006.01)
*B25J 9/10* (2006.01)
(Continued)

(52) U.S. Cl.
CPC ............. *B25J 9/105* (2013.01); *B25J 9/0024* (2013.01); *B25J 9/046* (2013.01); *B25J 9/126* (2013.01); *Y10S 901/23* (2013.01)

(58) Field of Classification Search
CPC . B25J 9/105; B25J 9/126; B25J 9/0024; B25J 9/047; B25J 9/046
(Continued)

(56) References Cited

U.S. PATENT DOCUMENTS 4,676,002 A * 6/1987 Slocum .................... B25J 9/046
                                                  33/1 MP
4,787,262 A * 11/1988 Kozawa ............... B25J 17/0283
                                                  310/323.17
(Continued)

FOREIGN PATENT DOCUMENTS

CN      101121264 A     2/2008
CN      101745917 A     6/2010
(Continued)

OTHER PUBLICATIONS

European Patent Office; Search Report in International Patent Application No. PCT/EP2014/057438 dated May 21, 2014; 4 pages.
(Continued)

*Primary Examiner* — Victor L Macarthur
*Assistant Examiner* — Bobby Rushing, Jr.
(74) *Attorney, Agent, or Firm* — Wood Herron & Evans LLP (57) ABSTRACT

An industrial robot includes a robot arm with multiple elements connected via joints, one element of which is designed as a linkage and another designed as an arm extension. The arm extension is mounted on one side of the linkage in a pivotal manner about a rotational axis by one of the joints and supports at least two other elements which form hand elements of the robot arm. An arm extension drive on the arm extension pivots the arm extension relative to the linkage, and a first hand element drive on the arm extension moves one of the hand elements relative to the arm extension. A motor shaft of the arm extension drive on the
(Continued)

arm extension is offset from and runs parallel to the rotational axis, and a motor shaft of the first hand element drive on the arm extension is perpendicular to and spaced from the rotational axis.

8 Claims, 5 Drawing Sheets

(51) Int. Cl.
*B25J 9/04* (2006.01)
*B25J 9/00* (2006.01)

(58) Field of Classification Search
USPC .............. 74/490.01, 490.03, 490.06, 490.08; 901/23, 26–29, 19, 24
See application file for complete search history.

(56) References Cited

U.S. PATENT DOCUMENTS

| | | | | |
|---|---|---|---|---|
| 5,305,652 A * | 4/1994 | Zimmer | ................ | B25J 9/047 74/490.01 |
| 5,606,235 A * | 2/1997 | Mauletti | ................ | B25J 9/046 318/12 |
| 5,697,255 A | 12/1997 | Miyamoto et al. | | |
| 6,223,618 B1 * | 5/2001 | Berninger | ................ | B25J 9/10 74/490.06 |
| 6,250,174 B1 | 6/2001 | Terada et al. | | |
| 6,267,022 B1 * | 7/2001 | Suzuki | ................ | B25J 19/0075 74/490.01 |
| 6,731,091 B2 * | 5/2004 | Hietmann | ............ | B25J 19/0054 318/563 |
| 7,441,584 B2 * | 10/2008 | Cruse | ................ | B22D 1/00 164/113 |
| 8,607,659 B2 * | 12/2013 | Zhang | ................ | B25J 9/102 74/490.01 |
| 8,863,606 B2 * | 10/2014 | Ichibangase | ........ | B25J 17/0283 74/490.01 |
| 2011/0126661 A1 * | 6/2011 | Long | ................ | B25J 9/047 74/490.05 |

FOREIGN PATENT DOCUMENTS

| | | |
|---|---|---|
| CN | 102079089 A | 6/2011 |
| CN | 102463571 A | 5/2012 |
| EP | 2024144 A1 | 2/2009 |

OTHER PUBLICATIONS

Chinese Patent Office; Office Action in Chinese Patent Application No. 20140034239.9 dated Aug. 3, 2016; 18 pages.

* cited by examiner

INDUSTRIAL ROBOT WITH A DRIVE ARRANGEMENT ARRANGED ON AN ARM EXTENSION

CROSS-REFERENCE

This application is a national phase application under 35 U.S.C. § 371 of International Patent Application No. PCT/EP2014/057438, filed Apr. 11, 2014 (expired), which claims the benefit of German Patent Application No. DE 10 2013 206 791.7 filed Apr. 16, 2013, the disclosures of which are incorporated by reference herein in their entirety.

TECHNICAL FIELD

The invention relates to an industrial robot, having a robot arm which has multiple links connected via joints, of which one link is designed as a rocker arm, and of which another link is designed as a boom arm which is mounted on one side of the rocker arm by means of one of the joints in a manner allowing pivoting about an axis of rotation, said boom arm carrying at least two more of the links, the same forming hand links of the robot arm, furthermore having a boom arm drive flange-mounted to the boom arm, designed to pivot the boom arm with respect to the link, having a first hand link drive flange-mounted to the boom arm, designed to move one of the hand links relative to the boom arm, and having a second hand link drive flange-mounted to the boom arm, designed to move another of the hand links relative to the boom arm and/or relative to the first hand link.

BACKGROUND

An industrial robot is known from EP 2 024 144 B1, having a robotic hand drive device which comprises multiple drive motors which are arranged in a boom of the robot, and which have drive shafts for the purpose of driving a robotic hand of the boom, wherein at least one of the drive motors is arranged at an offset to at least one of the other drive motors, forward along the axial direction towards the robotic hand, and the drive shafts of the drive motors are designed as straight shafts running parallel to each other and ending at the forward end substantially at the same axial height, wherein three drive shafts are included which are arranged in such a manner that a distance between the driveshaft of a central drive motor and one of the drive shafts of two lateral drive motors is less than the sum of the radii of the motor housing of an adjacent pair of the drive motors which are offset axially to each other.

The problem addressed by the invention is that of creating an industrial robot which has a large working area despite having a compact constructed size.

The problem is addressed by the invention by an industrial robot having a robot arm with multiple links connected via joints, of which one link is designed as a rocker arm and of which another link is designed as a boom arm which is mounted on one side of the rocker arm by means of one of the joints in a manner allowing pivoting about an axis of rotation, said boom arm carrying at least two more of the links, the same forming hand links of the robot arm, furthermore having a boom arm drive flange-mounted to the boom arm, designed to pivot the boom arm with respect to the link, having a first hand link drive flange-mounted to the boom arm, designed to move one of the hand links relative to the boom arm, wherein a motor shaft of the boom arm drive is arranged on the boom arm oriented to run with an offset to the axis of rotation, offset parallel thereto, and wherein a motor shaft of the first hand link drive is arranged on the boom arm oriented perpendicular to the axis of rotation and running at a distance from the axis of rotation. The industrial robot preferably also has a second hand link drive flange-mounted to the boom arm, designed to move another of the hand links relative to the boom arm and/or relative to the first hand link, wherein a motor shaft of the second hand link drive is arranged on the boom arm oriented perpendicular to the axis of rotation and running at a distance from the axis of rotation.

The drives—that is, of the boom arm drive, the first hand link drive and/or the second hand link drive—can be arranged in particular by flange-mounting the drives. It should be clear that in the following, the term "flange-mount" also means "arrangement," "attachment," and particularly "removable attachment,", and preferably also attachment by means of a flange.

In other words, the problem can be addressed by an industrial robot having a robot arm with multiple links connected via joints, of which one link is designed as a rocker arm and of which another link is designed as a boom arm which is mounted on one side of the rocker arm by means of one of the joints in a manner allowing pivoting about an axis of rotation, said boom arm carrying at least two more of the links, the same forming hand links of the robot arm, furthermore having a boom arm drive flange-mounted to the boom arm, designed to pivot the boom arm with respect to the link, having a first hand link drive flange-mounted to the boom arm, designed to move one of the hand links relative to the boom arm, and having a second hand link drive flange-mounted to the boom arm, designed to move another of the hand links relative to the boom arm and/or relative to the first hand link, wherein the boom arm drive with its motor shaft is flange-mounted to the boom arm oriented to run with an offset to the axis of rotation, offset parallel thereto, and both the first hand link drive and the second hand link drive, with their respective motor shafts, are flange-mounted on the boom arm running at a distance from each other and oriented perpendicular to the axis of rotation, running at respective distances from the axis of rotation.

Industrial robots are working machines which can be equipped for the automatic manipulation and/or processing of objects using tools, and can be programmed [for movement] by means of their joints in multiple movement axes—for example with respect to orientation, position, and work process.

SUMMARY

The industrial robot comprises the robot arm and a programmable controller (the control device), which during operation controls the movement sequences of the industrial robot in that one or more automatically or manually adjustable joints (robotic axes) are moved particularly by electrical drives, by the controller controlling the drives.

Robot arms can comprise, among other things, a frame and a horizontal rotating table which is rotatably mounted relative to the frame by means of a first joint, wherein a rocker arm is mounted on the horizontal rotating table in a manner allowing pivoting, by means of another joint. A boom arm is pivotably mounted on the rocker arm by means of a further joint. The boom arm carries a robot hand, and as such the boom arm and/or the robot hand can have multiple additional joints. According to the constructive design of the robot arm, the possible rotary movements of one or more joints and/or robotic axes can be limited by means of mechanical fixed stops, or by means of software switches via a control function.

The robot arm having multiple links connected via joints can be configured as an articulated robot with multiple links and joints arranged in series one after another. In particular, the robot arm can be designed as a six-axis articulated robot.

The boom arm can carry one, or at least two, hand links for the purpose of moving a hand flange, the same designed to attach a robot tool, for example. In one preferred embodiment, the boom arm carries three hand links, of which a first hand link is formed, for example, by the top arm, which is able to rotate relative to the bottom arm by means of a joint about a top arm axis which runs in the longitudinal direction of the boom arm, wherein a second hand link is formed by a hand element which is pivotably mounted relative to the top arm by means of a following joint, particularly a top arm fork, about a hand axis which runs perpendicular to the top arm axis, and wherein a third hand link is formed by the hand flange which is rotatably mounted about a hand flange axis.

Because the boom arm drive with its motor shaft is flange-mounted to the boom arm, oriented running at an offset to the axis of rotation and parallel thereto, space is created in this region making it possible to at least partially arrange two hand link drives there. As a result of such an arrangement, it is possible to accommodate the essential drives near to the joint which connects the boom arm pivotably to the rocker arm, without the drive housings protruding far beyond the contour of the robot arm. As a result of the fact that the drive housings do not then protrude far beyond the contour of the robot arm, it is possible for the rocker arms to have a very short and/or compact design without there being a risk of the boom arm no longer being able to pivot into an overhead position due to, by way of example, drive houses which protrude too far colliding with the horizontal rotating table.

Because both the first hand link drive, and preferably also the second hand link drive, are flange-mounted on the boom arm with their respective motor shafts parallel, running at a distance from each other and oriented perpendicular to the axis of rotation, running at respective distances from the axis of rotation, the contour area which is created by the axial length of the boom arm drive and which extends in the axial direction of the axis of rotation, can be used for an arrangement—in the case of two or more hand link drives, an arrangement next to each other—of the two or more hand link drives. By way of example, the constructed height of the boom arm is very small in a base position of the robot arm as a result.

The base position of the robot arm can be a pose of the robot arm wherein, if the industrial robot is mounted on a floor, the longitudinal extension of the rocker arm is oriented vertically upward, and the boom arm, arranged at a right angle to the rocker arm, is accordingly oriented horizontally. In all embodiments, the boom arm can be mounted on only one side of the rocker arm.

In general, the first hand link drive and/or the second hand link drive can be arranged and/or flange-mounted on the boom arm with their respective motor shafts running at the same distance from the axis of rotation.

In this case, the first hand link drive and/or the second hand link drive can be arranged on the same side of the axis of rotation. This makes it possible to make space on a side of the axis of rotation opposite the one or two hand link drives at the height of the joint of the robot arm positioned between the boom arm and the rocker arm, in order to make it possible to arrange and/or flange-mount the boom arm drive to the boom arm at this location. The boom arm drive is then arranged accordingly opposite the hand link drives with respect to the axis of rotation. The axis of rotation is defined in reference to the joint which connects the boom arm rotatably with the rocker arm.

In all designs, the first hand link drive and/or the second hand link drive can therefore be arranged and/or flange-mounted on the boom arm with their respective motor shafts at a distance from the axis of rotation in a direction which is oriented opposite the direction in which the motor shaft of the boom arm drive is arranged and/or flange-mounted on the boom arm, oriented parallel to the axis of rotation, running parallel to and with an offset to the same.

In general, the rocker arm has a second rocker arm joint which lies opposite, and/or can be arranged or designed opposite a first rocker arm joint of the rocker arm, said joint comprising the axis of rotation. In other words, the rocker arm joints can be arranged and/or constructed on ends and/or end regions of the rocker arm which are distal with respect to each other. In this case, when the industrial robot is in a base position in which the boom arm is oriented with its longitudinal extension at a right angle to the longitudinal extension of the rocker arm, the first hand link drive and/or the second hand link drive is/are flange-mounted on the boom arm with each respective motor shaft away from the axis of rotation, offset in the direction of the second rocker arm joint.

The term "base position" can be understood as any pose of the robot arm in which an adjustment of the joints of the industrial robot is also executed. For such an adjustment, an industrial robot typically has adjustment features on each joint which sit flush with each other, such as indents in the arm housing or adjustment bores in which adjustment tool sensors can be inserted.

A position and orientation of the first hand link drive and/or the second hand link drive arranged and/or flange-mounted on the boom arm with each respective motor shaft away from the axis of rotation, offset in the direction of the second rocker arm joint, is also termed—among other things—a negative offset.

As an alternative or in addition thereto, the rocker arm can have a second rocker arm joint which is opposite a first rocker arm joint, comprising the axis of rotation, of the rocker arm, wherein when the industrial robot is in a base position in which the boom arm is oriented with its longitudinal extension at a right angle to the longitudinal extension of the rocker arm, the boom arm drive is arranged and/or flange-mounted on the boom arm with its motor shaft away from the axis of rotation in a direction facing away from the second rocker arm joint.

In this case as well, "base position" can mean any pose of the robot arm in which an adjustment of the joints of the industrial robot can also be executed. For such an adjustment, an industrial robot typically has adjustment features on each joint which sit flush with each other, such as indents in the arm housing or adjustment bores in which adjustment tool sensors can be inserted.

A position and orientation of the boom arm drive flange-mounted on the boom arm with its motor shaft away from the axis of rotation, in the direction facing away from the second rocker arm joint, is also termed—among other things—a positive offset.

The first hand link drive and the second hand link drive can be arranged and/or flange-mounted on the boom arm with their respective motor shafts in the same plane.

The first hand link drive and the second hand link drive can be arranged and/or flange-mounted on the boom arm with their respective motor shafts in the same plane, which extends parallel to the axis of rotation.

The motor shaft of the boom arm drive can in general be coupled to a spur gear section of a gearing which is designed to move the joint which connects the boom arm to the rocker arm in a pivotable manner. As an alternative or in addition to a spur gear section, the motor shaft of the boom arm drive can also be coupled to a belt drive of a gearing which is designed to move the joint which connects the boom arm to the rocker arm in a pivotable manner.

A torque can be transmitted to a gearing by means of a spur gear section and/or a belt drive, via the motor shaft of the boom arm drive, said motor shaft being eccentric—that is, offset to the axis of rotation—said gearing in particular being mounted on the boom arm and/or the rocker arm concentrically to the axis of rotation.

In all embodiments, the boom arm can have a third hand link drive which is flange-mounted on or in the boom arm with its motor shaft oriented parallel to the motor shafts of the first hand link drive and/or of the second hand link drive, and with its drive housing offset forward towards a hand of the boom arm relative to the drive housing of the first hand link drive and/or the second hand link drive.

In such an embodiment, the boom arm carries three hand links, of which by way of example a first hand link is formed by the top arm, which is able to rotate, by means of a joint, relative to the bottom arm about a top arm axis which runs in the longitudinal extension of the boom arm, a second hand link is formed by a hand element which is mounted to allow pivoting with respect to the top arm, in particular a top arm fork, about a hand axis which runs perpendicular to the top arm axis, by means of a following joint, and a third hand link is formed by the hand flange which is rotatably mounted about a hand flange axis.

In all suitable designs, the boom arm drive can be designed in such a manner, and/or flange-mounted to the boom arm in such a manner that an end face of the boom arm drive, opposite the motor shaft output, projects to a lesser extent in the axial direction of the axis of rotation of the first joint of the rocker arm than the outermost of the two drives—of the first hand link drive and the second hand link drive—arranged adjacent to each other.

Because the boom arm drive is designed in such a manner and/or arranged and/or flange-mounted on the boom arm in such a manner that an axial end face of the boom arm drive opposite the motor shaft output projects to a lesser extent in the axial direction of the axis of rotation of the first joint of the rocker arm than the outermost of the two drives—of the first hand link drive and the second hand link drive—arranged adjacent to each other, the interference contour specified by the two hand link drives, as viewed in the axial direction of the axis of rotation, is not disadvantageously enlarged by the boom arm drive. In other words, the width of the robot arm in the region of the joint which connects the boom arm to the rocker arm, as specified by the two hand link drives, is preserved. The boom arm drive in this embodiment should therefore be designed or flange-mounted in such a manner that the length of the boom arm drive does not enlarge the width of the robot arm in the region of the joint which connects the boom arm to the rocker arm. This has the advantage that the interference contour in this region of the joint remains small.

BRIEF DESCRIPTION OF THE DRAWINGS

One embodiment of the invention is illustrated in an exemplary manner in the attached schematic drawings, wherein.

DETAILED DESCRIPTION

Figure 1:
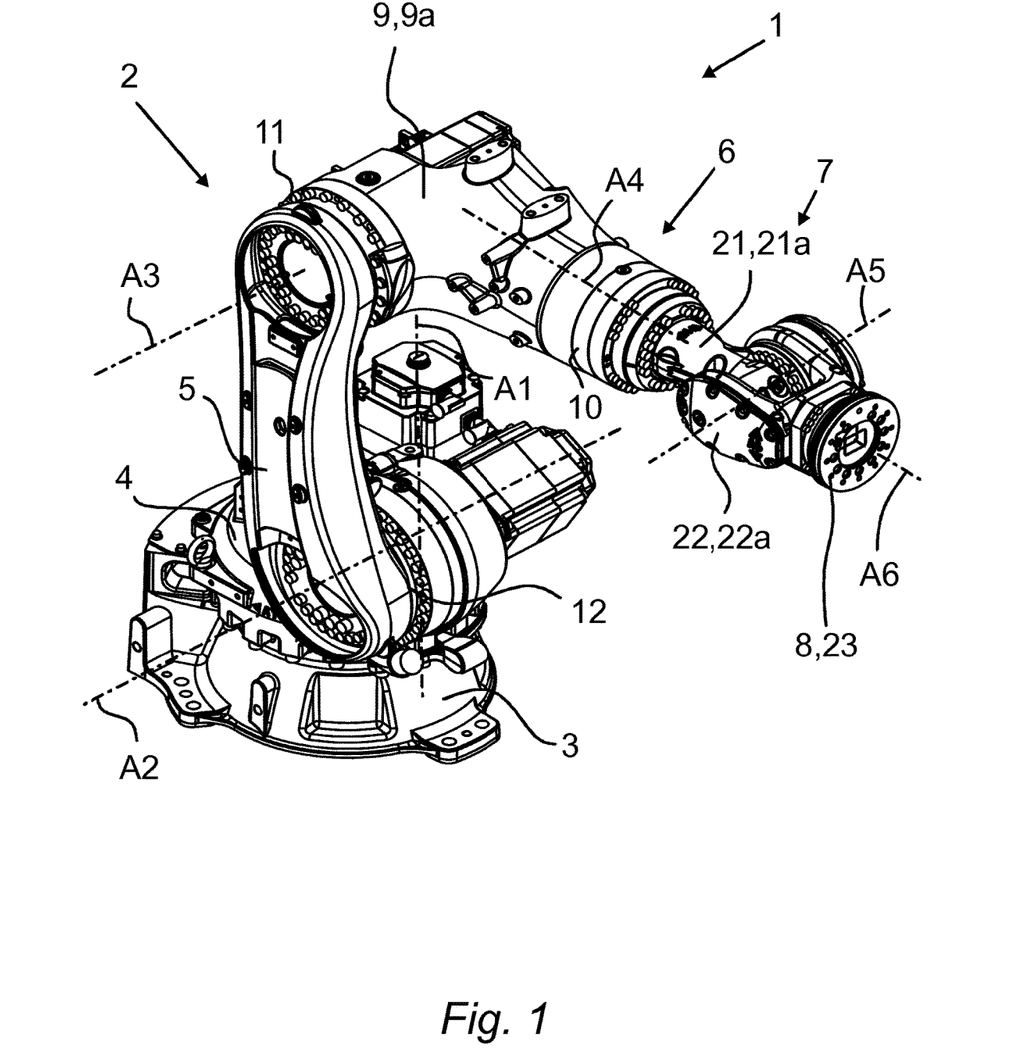
FIG. 1 shows a perspective view of an industrial robot, having a boom arm according to the invention, viewed from a forward angle.

FIG. 1 shows an industrial robot 1, having a robot arm 2. The robot arm 2 has in the case of the present embodiment multiple links arranged one after the other and connected by means of joints. The links are particularly a frame 3 and a horizontal rotating table 4 which is mounted to allow rotation relative to the frame 3 about an axis A1 running vertically. Additional links of the robot arm 2 are, in the case of the present embodiment, a rocker arm 5, a boom arm 6, and a preferably 6-axis robotic hand 7, the same having an attachment device designed as a flange 8 for the purpose of attaching an end effector, which is not illustrated in greater detail. The rocker arm 5 is mounted on the horizontal rotating table 4 to pivot about a preferably horizontal axis of rotation A2, by the lower end thereof—that is, by a second rocker arm joint 12 of the rocker arm 5, which can also be called a rocker arm head bearing. The boom arm 6 is then pivotably mounted about an axis A3 of the boom arm 6, said axis likewise preferably horizontal, on a first rocker arm joint 11 on the upper end of the rocker arm 5. Said boom arm 6 carries on its end the robotic hand 7, with its preferably three axes of rotation A4, A5, A6.

The boom arm 6 has, in the case of the present embodiment, an arm housing 9 mounted on the rocker arm 5. A hand base housing 10 of the boom arm 6 is mounted on the arm housing 9 to rotate about the axis A4.

Figure 2:
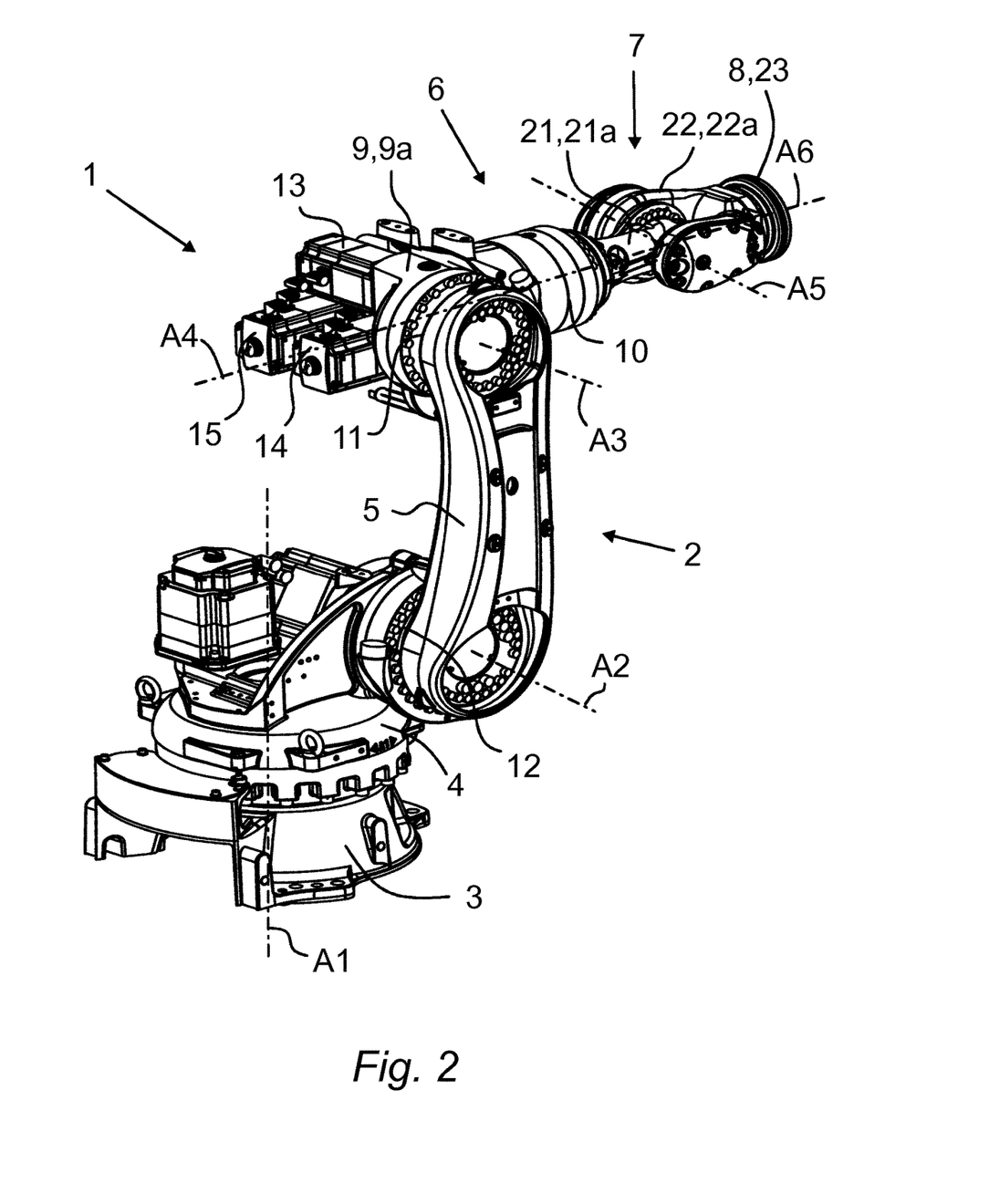
FIG. 2 shows a perspective view of the industrial robot in FIG. 1, having the boom arm, viewed from a rear angle.

In this embodiment shown in FIG. 1 and FIG. 2, the boom arm 6 carries three hand elements, of which a first hand link 21 is formed by the top arm 21a, which is able to rotate relative to the bottom arm 9a by means of a joint about a top arm axis (A4) which runs in the longitudinal direction of the boom arm 6, wherein a second hand link 22 is formed by a hand element 22a which is pivotably mounted relative to the top arm 21a by means of a following joint, particularly a top arm fork, about a hand axis (A5) which runs perpendicular to the top arm axis (A4), and wherein a third hand link 23 is formed by the flange 8, which is rotatably mounted about a hand flange axis (A6).

The base position of the robot arm 2 can be the pose of the robot arm 2 shown in FIGS. 1 and 2. In this pose, with the industrial robot 1 mounted on a floor as shown, the rocker arm 5 is arranged with its longitudinal extension oriented vertically upward, and the boom arm 6 is arranged at a right angle to the rocker arm 5, and is accordingly oriented horizontally.

Figure 3:
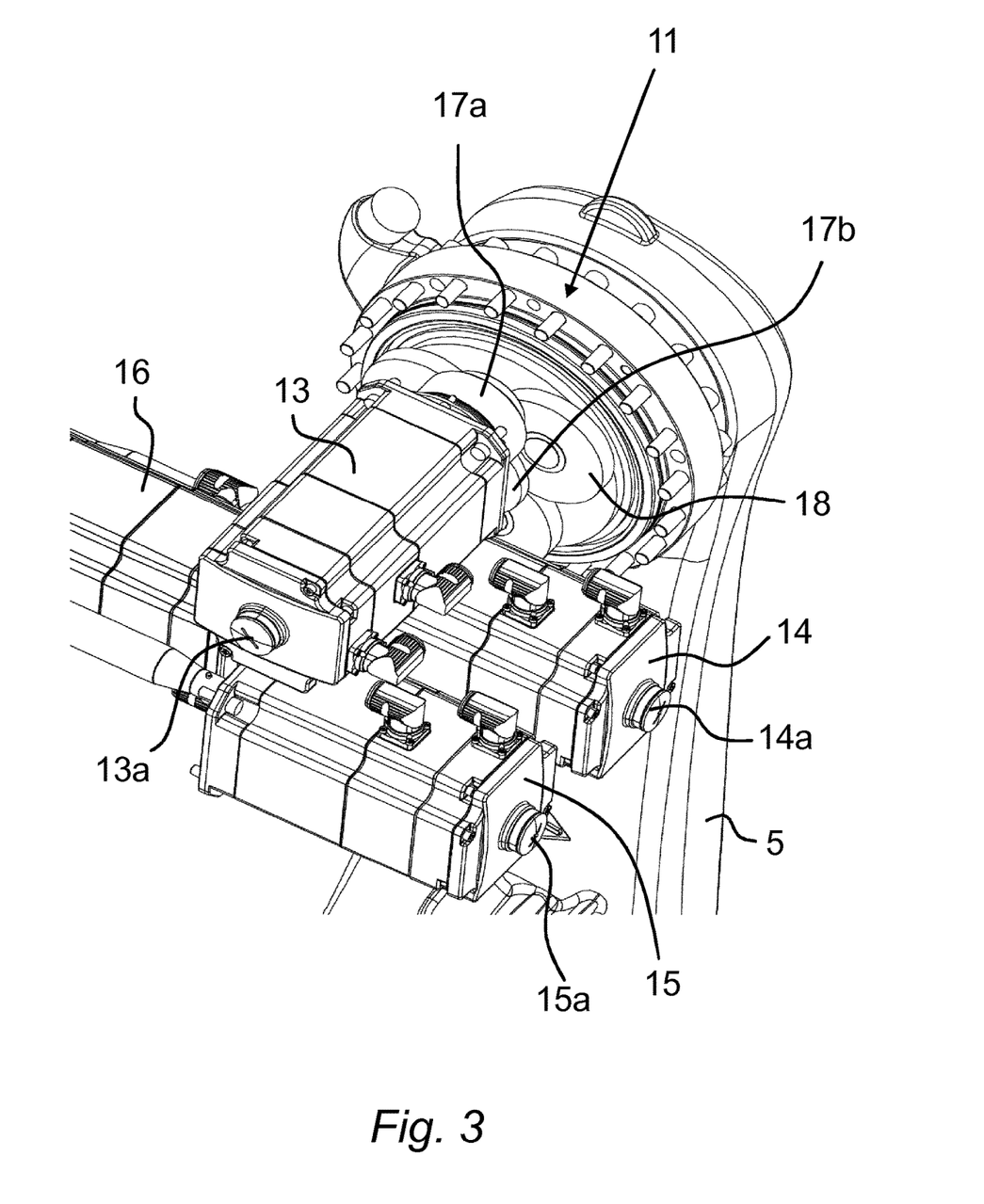
FIG. 3 shows an enlarged perspective view of an inventive arrangement of drives of the boom arm in FIG. 2.

As shown in FIG. 3 with no arm housing so as to clarify the illustration, the robot arm 2 has a boom arm drive 13 flange-mounted on the boom arm 6, designed to pivot the boom arm 6 relative to the rocker arm 5.

The robot arm 2 also has a first hand link drive 14 flange-mounted on the boom arm 6, designed to move one of the hand links 21, 22, 23 relative to the boom arm 6, and a second hand link drive 15 flange-mounted on the boom arm 6, designed to move another of the hand links 21, 22, 23 relative to the boom arm 6 and/or relative to the first hand link 21 or 22.

Figure 4:
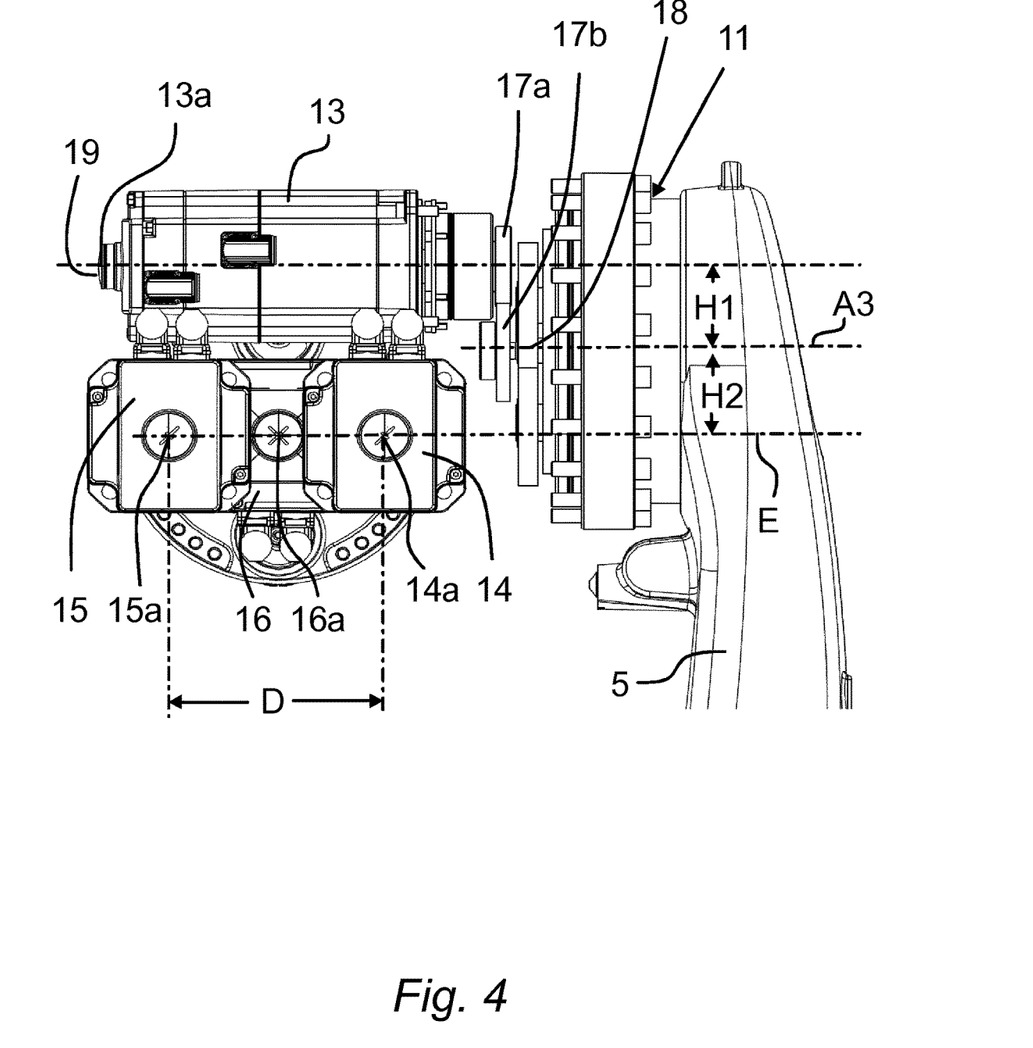
FIG. 4 shows a rear view of the arrangement of drives of the boom arm in FIG. 3.

As can be seen in particular in FIG. 4, the boom arm drive 13 is flange-mounted on the boom arm 6 with its motor shaft 13a oriented parallel to the axis of rotation A3 and running at an offset thereto and at a distance H1 therefrom. In addition, both the first hand link drive 14 and the second hand link drive 15 are flange-mounted on the boom arm 6 with their respective motor shafts 14a, 15a running parallel to each other at a distance D and oriented perpendicular to the axis of rotation A3, running at respective distances H2 from the axis of rotation A3.

The first hand link drive 14 and the second hand link drive 15 in the illustrated embodiment are flange-mounted on the boom arm 6 with their respective motor shafts 14a, 15a running at the same distance H2 from the axis of rotation A3.

The first hand link drive 14 and the second hand link drive 15 are flange-mounted on the boom arm 6 with their respective motor shafts 14a, 15a spaced from the axis of rotation A3 in a direction which is oriented opposite the direction in which the motor shaft 13a of the boom arm drive 13 is flange-mounted to the boom arm 6, oriented parallel to the axis of rotation A3 and running at an offset thereto at a distance H1 therefrom.

The first hand link drive 14 and the second hand link drive 15 are flange-mounted on the boom arm 6 with their respective motor shafts 14a, 15a in the same plane E. The plane E extends in this case parallel to the axis of rotation A3.

Coming back to the embodiment in FIG. 2, the rocker arm 5 has a second rocker arm joint 12 which is opposite the first rocker arm joint 11 of the rocker arm 5, said first rocker arm joint 11 comprising the axis of rotation A3, and/or is arranged at an opposite end of the rocker arm 5. In the base position of the industrial robot 1 as shown, in which the boom arm 6 is oriented with its longitudinal extension at a right angle to the longitudinal extension of the rocker arm 5, the first hand link drive 14 and the second hand link drive 15 are flange-mounted on the boom arm 6 with their respective motor shafts 14a, 15a away from the axis of rotation A3, offset in the direction of the second joint 12. In addition, the boom arm drive 13 is flange-mounted on the boom arm 6 with its motor shaft 13a away from the axis of rotation A3, in a direction facing away from the second rocker arm joint 12.

FIGS. 3 and 4 illustrate how the motor shaft 13a of the boom arm drive 13 is coupled to an exemplary spur gear section 17a, 17b of a gearing 18, which is designed to move the rocker arm joint 11 which pivotably connects the boom arm 6 to the rocker arm 5.

A torque can be transmitted to the gearing 18 by means of the spur gear section 17a, 17b, via the motor shaft 13a of the boom arm drive 13, said motor shaft 13a being arranged eccentric—that is, offset to the axis of rotation A3—said gearing 18 in particular being mounted on the rocker arm 5 concentric to the axis of rotation A3 in the illustrated embodiment.

As can also be seen in FIG. 3, the boom arm 6 has a third hand link drive 16 which is flange-mounted on or in the boom arm 6 with its motor shaft 16a (FIG. 4) oriented parallel to the motor shafts 14a, 15a of the first hand link drive 14 and of the second hand link drive 15, and with its drive housing offset forward towards a hand of the boom arm 6, with respect to the drive housing of the first hand link drive 14 and of the second hand link drive 15.

The boom arm drive 13 is designed is such a manner, and/or flange-mounted on the boom arm 6 in such a manner that an axial end face 19 of the boom arm drive 13, opposite and/or opposed to the motor shaft output, projects in the axial direction of the axis of rotation A3 of the first joint 11 of the rocker arm 5 to a lesser extent than the outermost drive—which in the illustrated embodiment is the second hand link drive 15.

Figure 5:
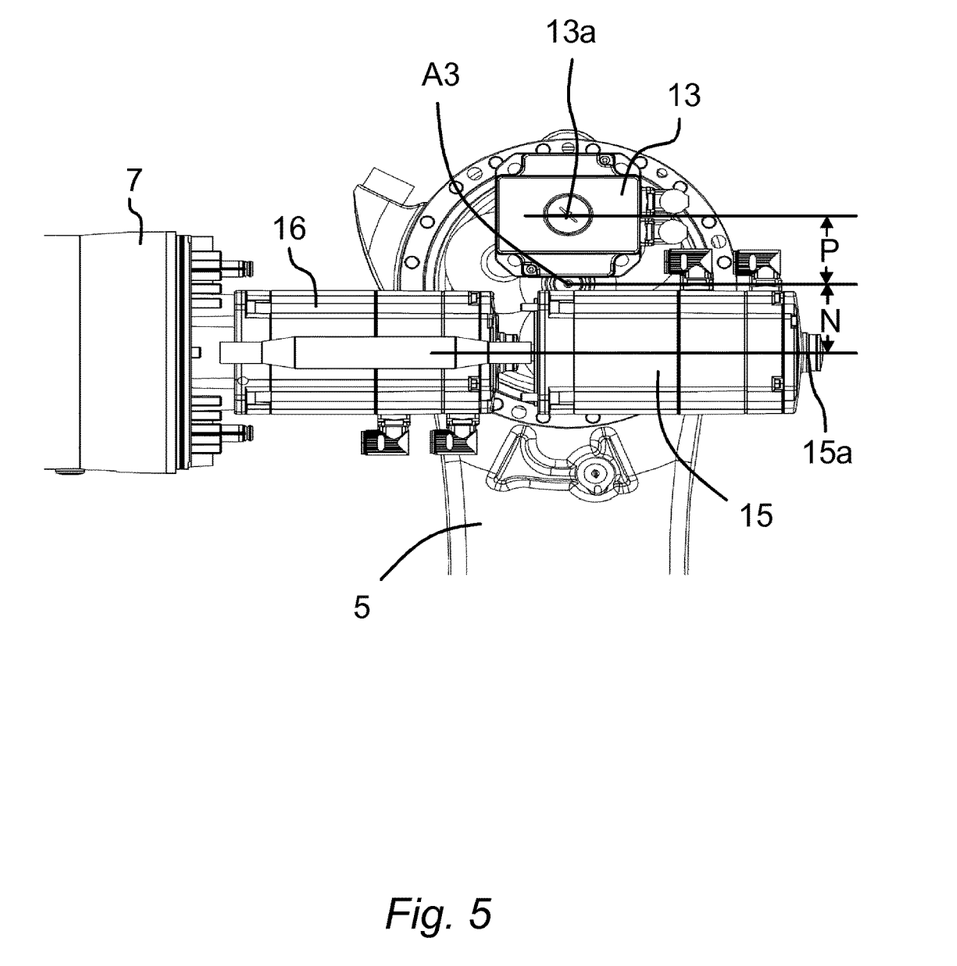
FIG. 5 shows a lateral view of the arrangement of drives of the boom arm in FIG. 3.

In addition to FIG. 4, FIG. 5 also shows how the position and orientation of the first hand link drive 14 and the second hand link drive 15, flange-mounted on the boom arm 6 with an offset in the direction of the second joint 12, with their respective motor shafts 14a, 15a away from the axis of rotation A3, constitute a negative offset—that is, offset N.

In addition to FIG. 4, FIG. 5 also shows how the position and orientation of the boom arm drive 13, flange-mounted on the boom arm 6 in a direction facing away from the second rocker arm joint 12, with its motor shaft 13a away from the axis of rotation A3, constitutes a positive offset—that is, offset P.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. An industrial robot, comprising:
 a robot arm having a plurality of links connected by joints, wherein one of the links is configured as a rocker arm and another link is configured as a boom arm;
 the boom arm mounted on one side of the rocker arm by a first one of the joints such that the boom arm pivots about an axis of rotation;
 the boom arm carrying at least two more of the links which form hand links of the robot arm;
 a boom arm drive arranged on the boom arm and operable to pivot the boom arm with respect to the rocker arm;
 a first hand link drive arranged on the boom arm and operable to move a first one of the hand links relative to the boom arm;
 a motor shaft of the boom arm drive arranged on the boom arm, the motor shaft of the boom arm offset from and extending in a direction parallel to the axis of rotation;
 a motor shaft of the first hand link drive arranged on the boom arm, the motor shaft of the first hand link drive oriented perpendicular to the axis of rotation and spaced at a distance from the axis of rotation;
 a second hand link drive arranged on the boom arm;
 the second hand link drive operable to move another one of the hand links relative to at least one of the boom arm or the first hand link; and
 a motor shaft of the second hand link drive arranged on the boom arm, the motor shaft of the second hand link drive oriented perpendicular to the axis of rotation and spaced a distance from the axis of rotation;
 wherein the first hand link drive and the second hand link drive are arranged on the boom arm with their respective motor shafts in the same plane;

wherein the first hand link drive and the second hand link drive are flange-mounted on the boom arm with their respective motor shafts in a plane that extends parallel to the axis of rotation;

a third hand link drive arranged in the boom arm;

a rotatable motor shaft of the third hand link drive oriented parallel to the motor shafts of the first hand link drive and the second hand link drive; and a drive housing of the third hand link drive offset with respect to a drive housing of the first hand link drive and a drive housing of the second hand link drive in a direction toward a hand of the boom arm;

wherein longitudinal axes of the motor shafts of the first, second, and third hand link drives are arranged in a common plane; and wherein the motor shaft of the third hand link drive is positioned between the motor shaft of the first hand link drive and the motor shaft of the second hand link drive.

2. The industrial robot of claim 1, wherein the first hand link drive and the second hand link drive are arranged on the boom arm with the respective motor shafts spaced at the same distance from the axis of rotation.

3. The industrial robot of claim 1, wherein at least one of the first hand link drive or the second hand link drive is arranged on the boom arm with its respective motor shaft spaced a distance from the axis of rotation in a direction that is opposite the direction in which the motor shaft of the boom arm drive is arranged on the boom arm.

4. The industrial robot of claim 3, wherein:

a second one of the joints is arranged on the rocker arm opposite the first joint that defines the axis of rotation; and in a base position of the industrial robot in which the boom arm is oriented with its longitudinal extension at a right angle to the longitudinal extension of the rocker arm, at least one of the first hand link drive or the second hand link drive is arranged on the boom arm with its respective motor shaft offset away from the axis of rotation in a direction toward the second joint.

5. The industrial robot of claim 3, wherein:

a second one of the joints is arranged on the rocker arm opposite the first joint that defines the axis of rotation; and in a base position of the industrial robot in which the boom arm is oriented with its longitudinal extension at a right angle to the longitudinal extension of the rocker arm, the boom arm drive is arranged on the boom arm with its motor shaft offset away from the axis of rotation.

6. The industrial robot of claim 1, wherein the motor shaft of the boom arm drive is coupled with at least one of a spur gear section or a belt drive of a gearing that moves the first joint which pivotably connects the boom arm to the rocker arm.

7. The industrial robot of claim 1, wherein the boom arm drive is configured in such a manner and/or is arranged on the boom arm such that an axial end face of the boom arm drive opposite an output end of the motor shaft of the boom arm drive projects in the axial direction of the axis of rotation to a lesser extent than either one of the first hand link drive or the second hand link drive that is positioned farthest from the rocker arm.

8. The industrial robot of claim 1, wherein the first, second, and third hand link drives are flange-mounted to the boom arm.

* * * * *